United States Patent [19]
Blount

[11] 3,937,782
[45] Feb. 10, 1976

[54] PROCESS FOR THE PRODUCTION OF MONOSILANDIOL

[76] Inventor: David H. Blount, 5450 Lea St., San Diego, Calif. 92105

[22] Filed: Mar. 24, 1975

[21] Appl. No.: 561,084

Related U.S. Application Data

[63] Continuation-in-part of Ser. No. 262,485, June 14, 1972, which is a continuation-in-part of Ser. No. 71,628, Sept. 11, 1970, abandoned.

[52] U.S. Cl. ............... 423/325; 423/438; 423/520; 423/551; 423/579
[51] Int. Cl.² C01B 33/00; C01D 5/02; C01B 13/00; C01B 31/20
[58] Field of Search ........... 423/325, 335, 339, 520, 423/551

[56] References Cited
UNITED STATES PATENTS

| | | | |
|---|---|---|---|
| 1,903,187 | 3/1933 | McClenahan | 423/339 |
| 3,345,132 | 10/1967 | Wulf | 423/325 |

Primary Examiner—Edward Stern

[57] ABSTRACT

A dry alkaline earth metal silicate or an alkali metal silicate is reacted with a concentrated mineral acid to form silico-formic acid and hydrogen salt. The acid and hydrogen salt is reacted with a dry alkali metal carbonate or hydroxide to produce monosilanal. Monosilanol is reacted with water to produce monosilandiol.

8 Claims, No Drawings

PROCESS FOR THE PRODUCTION OF MONOSILANDIOL

CROSS-REFERENCE TO RELATED COPENDING APPLICATION.

This application is a continuation-in-part of copending U.S. patent application Ser. No. 262,485 filed June 14, 1972, which is a continuation-in-part of U.S. patent application Ser. No. 71,628, filed Sept. 11, 1970, now abandoned.

SUMMARY OF THE INVENTION

The present invention relates to a process for the production of monosilandiol [$H_2Si(OH)_2$] by chemically reacting a dry alkaline earth metal silicate or an alkali metal silicate with a concentrated mineral acid forming silico-formic acid and a hydrogen salt. The silico-formic acid and hydrogen salt is then reacted with a dry alkaline earth metal or an alkali metal hydroxide or carbonate to form a solid white mass containing monosilanal and salt. Monosilanal reacts with water to form monosilandiol.

The present invention reacts one mol of a dry alkaline earth metal silicate or an alkali metal silicate with two mols of a concentrated mineral acid. The alkaline earth metal silicate usually used is calcium metasilicate. The alkali metal silicate usually used is sodium metasilicate. Concentrated sulfuric acid is usually used as the mineral acid. The alkaline earth metal carbonate usually used is calcium carbonate. The alkaline earth metal hydroxide usually used is calcium hydroxide. The alkali metal carbonate usually used is sodium carbonate. Many other compounds may be used to neutralize the silico-formic acid and hydrogen salt, such as metals, metal oxides, metal hydroxides, metal carbonates, alkaline earth metals, alkali metal oxides, and alkali metal salts of weak organic and inorganic acids.

I have discovered that monosilanal ($H_2SiO$) can be produced by the following steps:

1. Slowly add sodium metasilicate to sulfuric acid in the ratio of 1:2 mols, while agitating; silico-formic acid (H.SiO.OH) and sodium hydrogen sulfate are produced.
2. The sodium hydrogen sulfate is then reacted with sodium carbonate in the ratio of 2:1 mols and forms a solid mass, containing monosilanal and sodium sulfate; carbon dioxide and oxygen are given off.
3. The above solid mass is then washed with water; the monosilanal reacts with water to form monosilandiol, and the sodium sulfate is filtered off.

The chemical reaction involved in the above steps to produce monosilanal is complicated. When the first half of the sodium metasilicate is added to the concentrated sulfuric acid, it reacts with the acid to form silico-dihydrogen sulfate [$SiO.(HSO_4)_2$], sodium hydrogen sulfate and water. With the addition of the remaining sodium metasilicate it reacts with the silico-dihydrogen sulfate and sulfuric acid to form silico-formic acid and sodium hydrogen sulfate. Oxygen is evolved from the mixture in the later stage of the reaction. The sodium carbonate is then gradually mixed with the silico-formic acid and sodium hydrogen sulfate. Carbon dioxide and oxygen evolves from the semi-dry mixture and the hydrogen from the sodium hydrogen sulfate reacts with silico-formic acid to form monosilanal, sodium sulfate and water. It forms a solid mass in 1 to 2 hours. The solid mass is washed with water to remove the sodium sulfate, and the water reacts with monosilanal to form monosilandiol. Chemical reactions to form monosilanic acid (H.SiO.OH), monosilanal ($H_2SiO$), and monosilandiol ($H_2Si(OH)_2$)

1. $2Na_2SiO_3 + 4H_2SO_4 \longrightarrow 2H.SiO.OH + 4NaHSO_4 + O_2$
2. $2H.SiO.OH + 4NaHSO_4 + 2Na_2CO_3 \longrightarrow 2H_2SiO + 2Na_2SO_4 + 2CO_2 + O_2 + 2H_2O$
3. $H_2SiO + H_2O \longrightarrow H_2Si(OH)_2$ Water must not be added in the above reaction until the sodium hydrogen sulfate has been reacted with an alkali. Water will prevent the production of monosilanal.

Monosilandiol produced in this invention is a white granular compound that readily reacts with many organic compounds and inorganic compounds, such as alcohols, glycols, phenols, urea, aldehydes, ketones, unsaturated hydrocarbons, halogen hydrocarbons, nitriles, amines, lignin and others. It may also be copolymerized with organic compounds by a peroxide.

To test for silane groups produced in this invention, a suspension of the compound produced in this invention was made in water. A silver nitrate solution was added to the suspension and in a short time the silver nitrate was reduced; this caused the silver to be precipitated by the reduction, and caused the suspension to change from a brown to black color.

Monosilandiol may be used in the polymerization of many plastics, elastomers and natural products; as a filler in elastomers, resins, molding powder and pigments, as gas and oil absorbents, as a vehicle for insecticides and aromatics, as a thickening and thioxotropic agent for many liquids. It is readily soluble in dilute solutions of alkali metal hydroxide and will readily react with alkali metal hydroxide to form new compounds. It is readily soluble in "water glass" or solutions containing a salt of a weak acid and a strong base. When in solution, it may be used as a coating or it may be used as a paint when pigments are added.

The primary object of the present invention is to produce monosilanic acid (H.SiO.OH), and monosilanal ($H_2SiO$), which can be used to produce monosilandiol. A further object is to provide new and useful silicon compounds which will readily react with organic and inorganic compounds to form new and useful compounds. Still another object is to produce a silicon compound that is readily soluble in dilute alkali metal hydroxide solutions.

DESCRIPTION OF THE PREFERRED EMBODIMENTS

My invention will be illustrated in greater detail by the specific examples which follow, it being understood that these are merely illustrative of, and not limited to, procedures which may be used in the production of monosilandiol [$H_2Si(OH)_2$], in accordance with this invention.

EXAMPLE I

Sodium metasilicate pentahydrate is slowly added to concentrated sulfuric acid in the ratio of 1:2 mols over a period of 15 to 45 minutes, while agitating and keeping the temperature between 25° and 85°C. The reaction is completed in 4 to 12 hours, producing silico-formic acid and sodium hydrogen sulfate in the form of a white granular compound.

Sodium carbonate is slowly mixed with the above silicoformic acid and hydrogen sulfate in the ratio of one mole of sodium carbonate to one mole of silico-formic acid or until the pH is 8 to 10. Carbon dioxide and oxygen evolves from the mixture, and the mixture forms a solid mass in 1 to 2 hours, containing monosilanal and sodium sulfate.

Chemical reactions to produce monosilanal and monosilandiol:

1. $2Na_2SiO_3 \cdot 5H_2O + 4H_2SO_4 \longrightarrow 2H.SiO.OH + 4NaHSO_4 + O_2 + 10 H_2O$
2. $2H.SiO.OH + 4NaHSO_4 + 2Na_2CO_3 \longrightarrow 2H_2SiO + 4Na_2SO_4 + 2CO_2 + O_2 + 2H_2O$
3. $H_2SiO + H_2O \longrightarrow H_2Si(OH)_2$

EXAMPLE II

Dry granular potassium metasilicate is slowly added to concentrated sulfuric acid in the ratio of 1:2 mols over a period of about 15 to 45 minutes, while aggitating and keeping the temperature between 25° to 95°C. The reaction is completed in 4 to 12 hours, producing silico-formic acid and potassium hydrogen sulfate in the form of a white granular compound.

Potassium carbonate is slowly mixed with the above silico-formic acid and potassium hydrogen sulfate in the ratio of one mol of potassium carbonate to 2 mols of potassium hydrogen sulfate or until the pH is 8 to 10. Carbon dioxide and oxygen evolve from the granular white mixture and the mixture forms a solid mass in 1 to 2 hours, containing monosilanal and potassium sulfate. The mass is washed with water to filter off the potassium sulfate, and the monosilanal ($H_2SiO$) reacts with water to form monosilandiol [$H_2Si(OH)_2$], a white granular compound.

EXAMPLE III

Dry granular sodium metasilicate is mixed with sodium hydrogen sulfate in the ratio of 1:4 mols; the chemical reaction starts in 1 to 5 minutes, and oxygen is evolved in the reaction, producing a white granular mixture of silico-formic acid, sodium hydrogen sulfate and sodium sulfate.

Sodium carbonate is gradually mixed with the above mixture in the ratio of one mol of sodium carbonate to two mols of sodium hydrogen sulfate, or until a pH 8 to 10 is reached. Oxygen and carbon dioxide evolves from the reaction and produces a white solid mass in about 1 to 2 hours, containing monosilanal and sodium sulfate. The mass is then washed with water, filtered, and a white granular compound, silandiol is produced.

Chemical reactions to produce monosilanal ($H_2SiO$) and monosilandiol [$H_2Si(OH)_2$]

1. $Na_2SiO_3 + 4NaHSO_4 \longrightarrow H.SiO.OH + 2NaHSO_4 + 2Na_2SO_4$
2. $2H.SiO.OH + 4NaHSO_4 + 2Na_2CO_3 \longrightarrow H_2SiO + 4Na_2SO_4 + 2CO_2 + O_2 + 2H_2O$
3. $H_2SiO + H_2O \longrightarrow H_2Si(OH)_2$

EXAMPLE IV

Silico-formic acid and sodium hydrogen sulfate are mixed together in the ratio of 1:2 mols, then sodium carbonate is added to the above mixture in the ratio of 1 mol to 2 mols of sodium hydrogen sulfate. Oxygen and carbon dioxide evolve from the mixture, and the reaction is completed in about 30 to 60 minutes, producing monosilanal and sodium sulfate in a solid white mass. The solid white mass is then washed with water, filtered, and monosilanal ($H_2SiO$) reacts with water to form a white granular compound, monosilandiol [$H_2Si(OH)_2$].

What is claimed as new and desired to be protected by Letters Patent is set forth in the appended claims.

1. The method of producing monosilandiol by the following steps:
   a. a dry alkali metal metasilicate is added, with agitation over a period of 15 to 45 minutes to a mineral acid in the ratio of 1:2 mols, and the temperature is kept between 25° and 85°C; the chemical reaction is completed in 4 to 12 hours, producing silico-formic acid and an alkali metal hydrogen salt in the form of a white granular mixture; then
   b. an alkali metal carbonate is slowly mixed with the above silico-formic acid and alkali metal hydrogen salt until the pH is from 8 to 12; carbon dioxide and oxygen evolve from the mixture, and the mixture forms a solid mass in about 1 to 2 hours, which contains monosilanal and an alkali metal salt; then
   c. water is mixed with the above solid mass and the alkali metal salt is filtered off and the water reacts with monosilanal, thereby forming silandiol ($H_2Si(OH)_2$), a white granular compound.

2. The method of claim 1 wherein the alkali metal metasilicate is sodium metasilicate pentahydrate.

3. The method of claim 1 wherein the alkali metal metasilicate is potassium metasilicate.

4. The method of claim 1 wherein the alkali metal metasilicate is dry granular sodium metasilicate.

5. The method of claim 1 wherein the mineral acid is concentrated sulfuric acid.

6. The method of claim 1 wherein the mineral acid is concentrated phosphoric acid.

7. The method of claim 1 wherein the alkali metal carbonate is sodium carbonate.

8. The method of claim 1 wherein the alkali metal carbonate is potassium carbonate.

* * * * *